Nov. 30, 1954  K. A. McCOLLOM ET AL  2,695,987
TESTING CIRCUIT
Filed Nov. 19, 1951

INVENTORS.
K. A. McCOLLOM
D. R. DE BOISBLANC
BY
*Hudson and Young*
ATTORNEYS

United States Patent Office 2,695,987
Patented Nov. 30, 1954

2,695,987

TESTING CIRCUIT

Kenneth A. McCollom and Deslonde R. de Boisblanc, Idaho Falls, Idaho, assignors to Phillips Petroleum Company, a corporation of Delaware Application November 19, 1951, Serial No. 257,052

11 Claims. (Cl. 324—16)

This invention relates to a circuit for determining the resistance of discharge devices having a pair of spaced electrodes. In another aspect, it relates to a circuit for testing spark plugs.

In devices wherein an electric discharge is produced between a pair of spaced electrodes, such as spark plugs, a correlation has been found between the electrical resistance of the device and the remaining part of its useful life. Thus, a short interval before failure of the spark plug occurs, there may be a substantial drop in resistance. However, in order for the correlation to hold, the resistance must be measured under dynamic conditions, that is, while the spark plug is actually in operation in an internal combustion engine.

A decrease in resistance in the spark plug permits current to flow through leakage paths of low resistance which may exist in the structure. These leakage paths may exist between the ceramic insulating material of the spark plug and its electrodes, or they may result from stray capacitances between the electrodes and the engine block. The resistance of the ceramic insulating material usually decreases as the spark plug is operated under conditions of high engine temperature. Further, operation of the spark plug causes erosion of the electrodes, thereby varying their spacing and the resistance between them. Finally, solids are deposited around the electrodes as the spark plug is operated which can either increase or decrease its resistance, depending upon whether the deposit is relatively conducting or relatively insulating in nature.

We have devised an instrument wherein the effects on resistance produced by leakage of current through any of the above-described paths are combined into one instrument reading which is taken during the actual operation of the spark plug. It will be understood that the resistance of the spark gap becomes very low while the spark is actually present due to the ionization of the air-fuel mixture between the electrodes. The circuit of this invention eliminates the unwanted resistance variations due to ionization, as well as those resulting from the presence of the spark voltage in the measuring circuit.

It is an object of the invention to provide a circuit for measuring the resistance of discharge devices.

It is a further object to provide a circuit for measuring the resistance of spark plugs under conditions of engine operation.

It is a still further object to provide a circuit which is simple in construction, reliable in operation, and utilizes a minimum number of standard circuit components.

Various other objects, advantages and features of the invention will become apparent from the following detailed description taken in conjunction with the accompanying drawings, in which.

Figure 1:
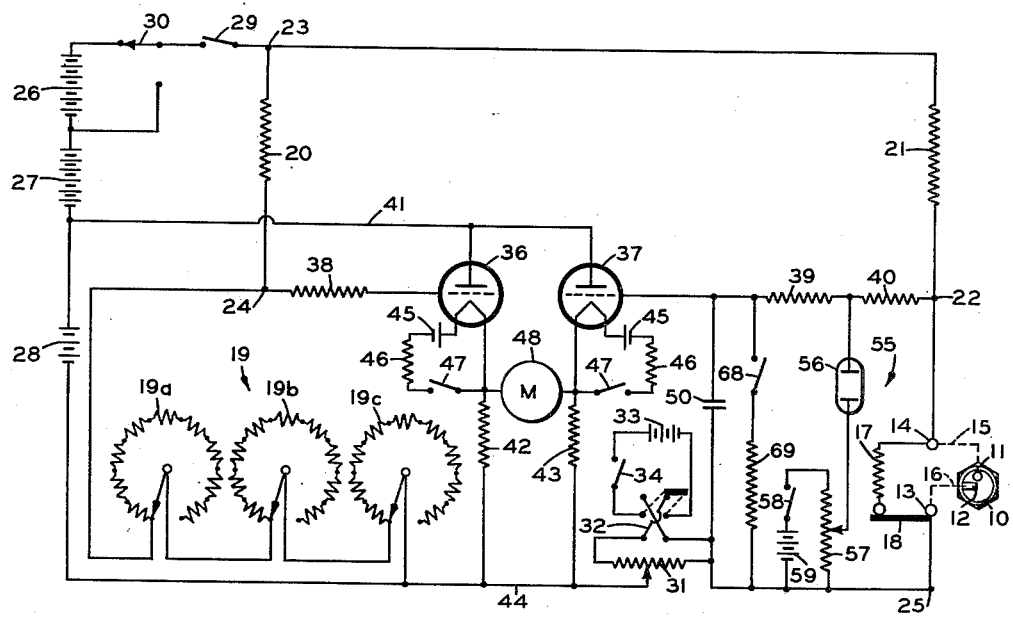
Figure 1 is a schematic circuit diagram of the measuring circuit of this invention.

Referring now to Figure 1, we have shown a discharge device 10, such as a spark plug, having a pair of spaced electrodes 11 and 12. These electrodes are connected to terminals 13 and 14 by leads 15, 16. The terminals are shunted by a fixed resistance 17 and a removable shorting bar 18 which are used in changing the scale of measurement.

Terminals 13, 14 are connected in circuit with a variable balancing resistance 19 and fixed balancing resistors 20, 21 to form a Wheatstone bridge circuit having corners 22, 23, 24 and 25.

A battery or other source of direct current, consisting of series-connected sections 26, 27 and 28, is connectable with opposite corners 23, 25 of the bridge by switches 29 and 30, switch 29 being an "on-off" switch and switch 30 being operable to remove battery section 26 from the circuit. Also included in the circuit is a variable adjusting potentiometer 31, the fixed terminals of which are connected through a reversing switch 32 to a battery 33 and switch 34.

As those skilled in the art will understand, the direct current source impresses a voltage across the terminals 13, 14 and across the variable balancing resistor 19. Assuming that the balancing resistors 20, 21 are of equal ohmic value, the voltage between bridge corners 22, 24 will be zero when the ohmic value of balancing resistor 19 is equal to that existing between the electrodes 11, 12 of the discharge device 10. In order to permit accurate adjustments of resistance, variable balancing resistor 19 may consist of three series-connected sections 19a, 19b and 19c so graduated as to permit an accurate stepwise adjustment of ohmic value.

Thus, with resistors 20, 21 of equal ohmic value, the bridge is balanced when the resistance of unit 19 is equal to that between the electrodes 11, 12, it being understood that the bridge is also balanced when resistors 20, 19 have the same ratio of resistance as resistors 21 and 11, 12 if the fixed resistors 20, 21 are not of equal ohmic value. The potentiometer 31 with its associated reversing switch and battery introduce an initial adjusting potential into the bridge circuit to permit balancing thereof for calibration purposes before the testing operation is initiated.

The potential difference between bridge corners 22, 24 can be determined in any suitable manner. As shown and preferably, two electron tubes 36, 37 of the triode type are provided, a fixed resistance 38 having one end thereof connected to bridge corner 24 and its other end connected to the control grid of tube 36, and a pair of series-connected fixed resistances 39, 40 of equal ohmic value having one end thereof connected to bridge corner 22 and terminal 14, the other end of the series combination being connected to the control grid of tube 37. The anodes of both tubes are connected by a lead 41 to the junction between battery sections 27, 28 and the cathodes of the tubes are connected through the respective cathode resistances 42, 43 to a lead 44 connected to the negative terminal of battery section 28. As shown, tubes 36, 37 are of the filament type and each has a filament circuit including a battery 45, a fixed resistance 46 and a switch 47. A meter 48 has its terminals connected to the respective cathodes of tubes 36, 37 or, alternatively, to any point in the anode-cathode circuits of the tubes which are normally at the same potential.

It will be understood that the potential difference across the meter terminal is zero when equal voltages are applied to the control grids of the tubes, that is, when the potentials at bridge corners 22, 24 are equal and the bridge is balanced. This results from the fact that resistors 42, 43 are of equal ohmic value and the ohmic value of resistance 38 is equal to the sum of the ohmic values of resistances 39 and 40. Of course, appropriate adjustments can be made if it is desired to have unequal values for certain sets of these resistances.

In accordance with the invention, a condenser 50 is connected between terminal 13 and the junction between the control grid of tube 37 and resistance 39. When the spark plug 10 is operating, an alternating spark current flows through the resistances 39, 40 to the control grid of tube 37, this current having the form illustrated by the waves 51, Figure 2a. Due to the relatively low impedance of condenser 50 to alternating current, as compared to the impedance existing between the control grid and cathode of tube 37, practically all of the alternating spark current flows through the condenser and, hence, does not affect the operation of the tube 37. However, referring to Figure 2a, it will be noted that the positive portions 52 of the waves are of substantially greater area than the negative portions 53. Since condenser 50 is of relatively high capacity so as to provide a low impedance alternating current path, it will be evident that a charge will gradually accumulate upon the condenser during successive cycles of engine operation where the spark impulses are of the unbalanced nature shown in Figure 2a. If this effect were not compensated for, a direct current potential would be developed across condenser 50 which would change the potential of the control grid of tube 37, thereby giving a false reading.

This effect is compensated for, in accordance with our invention, by providing a clipping circuit 55 in the input circuit of tube 37. As shown and preferably, the clipping circuit extends from the junction of resistances 39, 40 to the terminal 13. In a preferred modification, this circuit includes a neon tube 56 having one terminal connected to the junction between resistances 39, 40, its other electrode being connected to the contactor of a potentiometer 57, one fixed terminal of which is connected to terminal 13, the other fixed terminal being connected in circuit with a switch 58 and a battery 59 and the terminal 13.

Figure 2A:
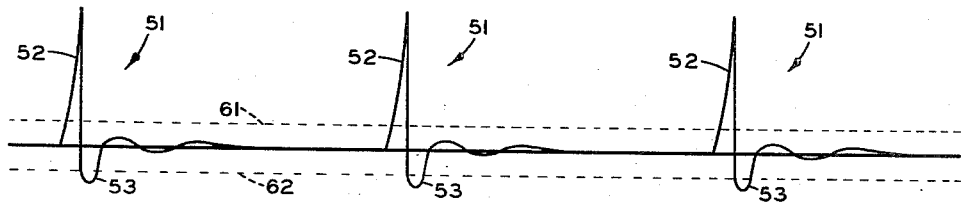
Figures 2a and 2b are graphs illustrating wave forms at various parts of the circuit, the ordinate being voltage, and the abcissa being time.
Figure 2B:
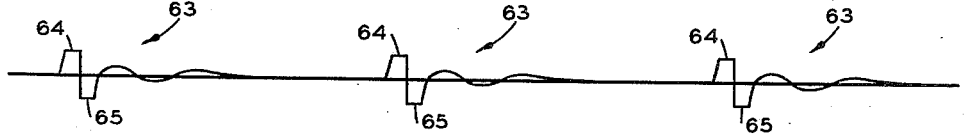

If the potential at the junction of resistances 39, 40 exceeds that at terminal 13 by an amount greater than the break down voltage of neon tube 56 plus the bias voltage between the contactor and lower fixed terminal of potentiometer 57, the neon tube will break down and the current will flow through this tube rather than through condenser 50. Similarly, if the potential at terminal 13 exceeds that at junction 39, 40 by an amount greater than the voltage drop across the lower section of potentiometer 57 plus the break down voltage of tube 56, a current will flow in the opposite direction through the neon tube, rather than through the condenser 50. The voltages at which break down occurs can, of course, be controlled by adjustment of potentiometer 57. It will be evident, therefore, that the circuit functions as a bidirectional clipping circuit which prevents voltages of greater or less than predetermined amplitudes from passing to the condenser 50. The effect of the clipping circuit upon the waves 51 is shown in Figures 2a and 2b wherein it will be noted that the portions of these waves above and below predetermined amplitudes represented by lines 61, 62 are eliminated. This results in a waveform such as indicated at 63, Figure 2b, in which the area 64 above the axis is approximately equal to the area 65 below the axis. As a result, no charge accumulates upon condenser 50 and the alternating spark voltages are efficiently bypassed. Further, the direct current resistance of the spark plug is indicated by the bridge circuit in the manner already described.

In balancing the bridge circuit, it is desirable to provide for passing current impulses to meter 48 to cause it to move rapidly in either direction, thereby facilitating the balancing operation and making it more rapid. This result is accomplished by switch 30 and by a switch 68 connected in series with a fixed resistance 69 across the condenser 50. Operation of switch 30 decreases the voltage applied to corners 23, 25 of the bridge and causes a deflection of the meter in one direction while operation of switch 68 discharges condenser 50 and moves the meter needle in the other direction.

Figure 3:
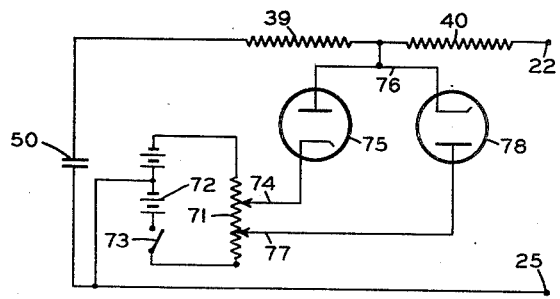
Figure 3 is a view of a modified form of clipping circuit.

A modified clipping circuit is shown by Figure 3, it being understood that this circuit can be substituted for the clipping circuit 55 of Figure 1. In this circuit, it will be noted that terminal 13 and bridge corner 25 are connected to one fixed terminal of a potentiometer 71, the other fixed terminal being connected in circuit with a battery 72, a switch 73 and the first fixed terminal. Potentiometer 71 has a contactor 74 which is connected to the cathode of a diode 75, the anode of which is connected by a lead 76 to the junction between resistances 39, 40. Potentiometer 71 has a second contactor 77 which is connected to the anode of a diode 78, the cathode of which is connected to lead 76. It will be apparent that this clipping circuit functions in the same manner as the clipping circuit 55 of Figure 1. When the voltage at terminal 22 is more positive than that at terminal 25 by an amount greater than the minimum operating voltage of tube 75 and the voltage drop between contactor 74 and terminal 25, a current flows through the diode rather than through condenser 50. Similarly, if terminal 25 is more positive than terminal 22 by an amount which is greater than the voltage drop between contactor 77 and terminal 25 plus the minimum operating potential of diode 78, current flows in the opposite direction through the latter tube rather than through the condenser 50. In this manner, a bidirectional clipping effect is produced which transforms the waves 52 of Figure 2a into the waves 63 of Figure 2b. In some cases, the balancing of the positive and negative areas of the wave 63 can be obtained merely by clipping the top portions of waves 52. In this case, diode 78 can be omitted and only the tube 75 is necessary for proper balancing of the circuit.

It will be evident that we have achieved the objects of our invention in providing a circuit for measuring the direct current resistance of a spark plug, or other discharge device having a pair of spaced electrodes, while it is in actual operation. The measuring circuit eliminates the effects of the alternating spark voltages and the changes in resistance produced by ionization of the discharge path between the gap electrodes. Further, the device is quite accurate in operation and utilizes a minimum number of standard circuit components.

While the invention has been described in connection with a present, preferred embodiment thereof, it is to be understood that this description is illustrative only and is not intended to limit the invention.

We claim:

1. A spark plug testing circuit which comprises, in combination, first and second terminals adapted for connection to a spark plug, a variable balancing resistor and a pair of fixed resistors connected in Wheatstone bridge circuit with said terminals, a source of direct current connected between said first terminal and the bridge corner opposite said first terminal, a first fixed resistance having one end thereof connected to the bridge corner opposite said second terminal, a second fixed resistance having one end thereof connected to said second terminal, a condenser connected between the other end of said second fixed resistance and said first terminal, means for comparing the potentials appearing at the other ends of said fixed resistances, and means for indicating the presence of a potential difference between said other ends of said fixed resistances.

2. A spark plug testing circuit which comprises, in combination, first and second terminals adapted for connection to a spark plug, a variable balancing resistor and a pair of fixed resistors connected in Wheatstone bridge circuit with said terminals, a source of direct current connected between said first terminal and the bridge corner opposite said first terminal, a fixed resistance having one end thereof connected to the bridge corner opposite said second terminal, a second fixed resistance having one end thereof connected to said second terminal, a condenser connected between the other end of said second fixed resistance and said first terminal, a clipping device connected in parallel with said condenser, said clipping device normally being non-conductive and becoming conductive when the voltage across said condenser exceeds a predetermined value, and means for indicating the presence of a potential difference between the other ends of said fixed resistances.

3. A circuit constructed in accordance with claim 2 in which the clipping device is a neon tube.

4. A device constructed in accordance with claim 2 in which the clipping device is a pair of diode tubes connected in parallel, the anode of each diode being connected to the cathode of the other diode.

5. A spark plug testing circuit which comprises, in combination, a pair of terminals adapted for connection to a spark plug, a variable balancing resistor and a pair of fixed resistors connected in Wheatstone bridge circuit with said terminals, a source of direct current connected between one of said terminals and the bridge corner opposite said one terminal, a first fixed resistance having one end thereof connected to the bridge corner opposite said other terminal, a second fixed resistance having one end thereof connected to said other terminal, a condenser connected between the other end of said second fixed resistance and said one terminal, a pair of electron tubes each having an anode, a cathode and a control grid, means for supplying operating potentials to the electrodes of said tubes, a meter connected between points in the anode-cathode circuits of said tubes which are normally at the same potential, and leads connecting said control grids to the respective other ends of said fixed resistances.

6. A spark plug testing circuit which comprises, in combination, first and second terminals adapted for connection to a spark plug, a pair of fixed resistors and a variable balancing resistor connected in series with said terminals to define a Wheatstone bridge, a source of direct current connected between said first terminal and the junction between said fixed resistors, a fixed resistance having one end connected to the junction between said balancing resistor and its adjacent fixed resistor, a pair of series-connected resistances having one end thereof connected to said second terminal, the total ohmic value of said series-connected resistances being equal to the ohmic value of said fixed resistance, a condenser connected between the other end of said series-connected resistances and said first terminal, a clipping device connected between said first terminal and the junction between said series-connected resistances, and means for determining the presence of a potential difference between the other ends of said fixed resistance and said series-connected resistances.

7. A spark plug testing circuit which comprises, in combination, first and second terminals adapted for connection to a spark plug, a pair of fixed resistors and a variable balancing resistor, connected in series with said terminals to define a Wheatstone bridge, a source of direct current connected between said first terminal and the junction between said fixed resistors, a fixed resistance having one end connected to the junction between said balancing resistor and its adjacent fixed resistor, a pair of series-connected resistances having one end thereof connected to said second terminal, the total ohmic value of said series-connected resistances being equal to the ohmic value of said fixed resistance, a condenser connected between the other end of said series-connected resistances and said first terminal, a clipping device connected between said first terminal and the junction between said series-connected resistances, a pair of electron tubes each having an anode, a cathode and a control grid, means for supplying operating potentials to the electrodes of said tubes, a meter connected between points in the anode-cathode circuits of said tubes which are normally at the same potential, and leads connecting said control grids to the respective other ends of said fixed resistance and said series connected resistances.

8. A circuit in accordance with claim 7 in which the clipping device comprises a potentiometer, a battery connected to the fixed terminals of said potentiometer, and a neon tube connected to the contactor of said potentiometer.

9. A circuit constructed in accordance with claim 7 in which the clipping device comprises a potentiometer, a battery connected to the fixed terminals thereof, a lead, a diode having its anode connected to said lead and its cathode connected to a contactor on said potentiometer, and a second diode having its cathode connected to said lead and its anode connected to a second contactor on said potentiometer.

10. A spark plug testing circuit which comprises, in combination, first and second terminals adapted for connection to a spark plug, a pair of fixed resistors, a variable balancing resistor, and an adjusting potentiometer connected in series with said terminals to define a Wheatstone bridge, a battery, a reversing switch connecting the battery terminals in circuit with the fixed terminals of said potentiometer, said bridge circuit including the portion of said potentiometer between the contactor and one fixed terminal thereof, a source of direct current connected between said first terminal and the junction between said fixed resistors, a fixed resistance having one end connected to the junction between said balancing resistor and its adjacent fixed resistor, a pair of series-connected resistances having one end thereof connected to said second terminal, the total ohmic value of said series-connected resistances being equal to the ohmic value of said fixed resistance, a condenser connected between the other end of said series-connected resistances and said first terminal, a clipping device connected between said first terminal and the junction between said series-connected resistances, a pair of electron tubes each having an anode, a cathode and a control grid, means for supplying operating potentials to the electrodes of said tubes, a meter connected between points in the anode-cathode circuits of said tubes which are normally at the same potential, leads connecting said control grid to the respective other ends of said fixed resistance and said series connected resistances.

11. A spark plug testing circuit which comprises, in combination, first and second terminals adapted for connection to a spark plug, a pair of fixed resistors, a variable balancing resistor, and an adjusting potentiometer connected in series with said terminals to define a Wheatstone bridge, a battery, a reversing switch connecting the battery terminals in circuit with the fixed terminals of said potentiometer, said bridge circuit including the portion of said potentiometer between the contactor and one fixed terminal thereof, a source of direct current connected between said first terminal and the junction between said fixed resistors, a fixed resistance having one end connected to the junction between said balancing resistor and its adjacent fixed resistor, a pair of series-connected resistances having one end thereof connected to said second terminal, the total ohmic value of said series-connected resistances being equal to the ohmic value of said fixed resistance, a condenser connected between the other end of said series-connected resistances and said first terminal, a clipping device connected between said first terminal and the junction between said series-connected resistances, a pair of electron tubes each having an anode, a cathode and a control grid, means for supplying operating potentials to the electrodes of said tubes, a meter connected between points in the anode-cathode circuits of said tubes which are normally at the same potential, leads connecting said control grids to the respective other ends of said fixed resistance, a switch for lowering the effective voltage of said source of direct current, a switch, a fixed resistor connected in series with said switch, and leads connecting said switch and fixed resistor in parallel with said condenser and said series connected resistances.

References Cited in the file of this patent

UNITED STATES PATENTS

| Number | Name | Date |
|---|---|---|
| 1,660,405 | Affel | Feb. 28, 1928 |
| 2,324,458 | Peters et al. | July 13, 1943 |
| 2,458,974 | Bauer | Jan. 11, 1949 |
| 2,459,849 | Stateman | Jan. 25, 1949 |
| 2,498,103 | Wojciechowski | Feb. 21, 1950 |
| 2,578,455 | Seely | Dec. 11, 1951 |
| 2,583,130 | Wrolson et al. | Jan. 22, 1952 |
| 2,594,138 | Elam | Apr. 22, 1952 |
| 2,649,567 | Gaetani et al. | Aug. 18, 1953 |